(12) United States Patent
Dang et al.

(10) Patent No.: US 10,624,037 B2
(45) Date of Patent: Apr. 14, 2020

(54) WIRELESS COMMUNICATION APPARATUS AND METHOD, BASE STATION, USER EQUIPMENT AND COMMUNICATION SYSTEM

(71) Applicant: Sony Corporation, Tokyo (JP)

(72) Inventors: Jian Dang, Nanjing (CN); Zaichen Zhang, Nanjing (CN); Liang Wu, Nanjing (CN); Chao Wei, Nanjing (CN); Yu Shi, Nanjing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/285,209

(22) Filed: Feb. 26, 2019

(65) Prior Publication Data

US 2019/0191383 A1 Jun. 20, 2019

Related U.S. Application Data

(63) Continuation of application No. 15/549,906, filed as application No. PCT/CN2016/073850 on Feb. 16, 2016, now Pat. No. 10,271,286.

(30) Foreign Application Priority Data

Feb. 17, 2015 (CN) .......................... 2015 1 0086889

(51) Int. Cl.
*H04W 52/14* (2009.01)
*H04W 72/04* (2009.01)
(Continued)

(52) U.S. Cl.
CPC ........... *H04W 52/146* (2013.01); *H04L 27/26* (2013.01); *H04L 27/2626* (2013.01);
(Continued)

(58) Field of Classification Search
None
See application file for complete search history.

(56) References Cited

U.S. PATENT DOCUMENTS 8,537,922 B2 * 9/2013 Wang .................. H04B 7/0417
375/267
2005/0030897 A1 2/2005 Sandhu
(Continued)

FOREIGN PATENT DOCUMENTS

| CN | 1894864 A | 1/2007 |
|----|-----------|--------|
| CN | 101296002 A | 10/2008 |
| CN | 102378335 A | 3/2012 |

OTHER PUBLICATIONS

International Search Report dated Mar. 25, 2016 in PCT/CN2016/073850 filed Feb. 16, 2016.

*Primary Examiner* — Mohammed Rachedine
(74) *Attorney, Agent, or Firm* — Xsensus LLP

(57) ABSTRACT

Provided is a wireless communication apparatus for a non-orthogonal multiple access communication system. The apparatus comprises: a power adjustment unit which is used, for at least some of user equipment included in the communication system, dynamically adjusting the sending power of each of the at least some of the user equipment for each sub-carrier according to channel state information about the communication system, in order that the at least some of the user equipment perform uplink data transmission on corresponding sub-carriers with the adjusted sending power. According to the disclosed apparatus, method and system, at least one of the following technical benefits could be obtained: increasing the channel capacity of the communication system; reducing the bit error rate during the communication; and reducing the interference between corresponding user equipment in the communication system.

16 Claims, 9 Drawing Sheets

(51) Int. Cl.
*H04W 52/32* (2009.01)
*H04W 88/08* (2009.01)
*H04W 88/02* (2009.01)
*H04W 52/26* (2009.01)
*H04L 27/26* (2006.01)
*H04J 11/00* (2006.01)
*H04W 52/34* (2009.01)
*H04W 52/24* (2009.01)

(52) U.S. Cl.
CPC ....... *H04W 52/325* (2013.01); *H04W 72/044* (2013.01); *H04J 11/004* (2013.01); *H04J 2211/008* (2013.01); *H04W 52/243* (2013.01); *H04W 52/265* (2013.01); *H04W 52/346* (2013.01); *H04W 88/02* (2013.01); *H04W 88/08* (2013.01)

(56) References Cited

U.S. PATENT DOCUMENTS

| | | |
|---|---|---|
| 2005/0031047 A1* | 2/2005 | Maltsev .............. H04W 52/346 375/260 |
| 2005/0032478 A1 | 2/2005 | Stephens et al. |
| 2005/0032514 A1 | 2/2005 | Sadri et al. |
| 2005/0034053 A1 | 2/2005 | Jacobsen et al. |
| 2005/0041611 A1 | 2/2005 | Sandhu |
| 2005/0068916 A1 | 3/2005 | Jacobsen et al. |
| 2005/0136933 A1 | 6/2005 | Sandhu et al. |
| 2005/0147076 A1 | 7/2005 | Sadowsky et al. |
| 2005/0157695 A1 | 7/2005 | Stephens et al. |
| 2005/0157734 A1 | 7/2005 | Li et al. |
| 2005/0213552 A1* | 9/2005 | Bar-Ness ............ H04L 27/2608 370/342 |
| 2007/0291639 A1 | 12/2007 | Jacobsen et al. |
| 2008/0181162 A1 | 7/2008 | Stephens et al. |
| 2008/0253471 A1 | 10/2008 | Sadowsky et al. |
| 2009/0147879 A1 | 6/2009 | Sandhu |
| 2009/0207829 A1 | 8/2009 | Peng et al. |
| 2009/0245405 A1 | 10/2009 | Sadowsky et al. |
| 2009/0252257 A1 | 10/2009 | Sadowsky et al. |
| 2010/0098181 A1 | 4/2010 | Jacobsen et al. |
| 2010/0195545 A1 | 8/2010 | Sadowsky et al. |
| 2011/0013524 A1 | 1/2011 | Stephens et al. |
| 2011/0096856 A1 | 4/2011 | Sadowsky et al. |
| 2012/0236911 A1 | 9/2012 | Sadowsky et al. |
| 2013/0077661 A1 | 3/2013 | Jacobsen et al. |

* cited by examiner

WIRELESS COMMUNICATION APPARATUS AND METHOD, BASE STATION, USER EQUIPMENT AND COMMUNICATION SYSTEM

CROSS-REFERENCE TO RELATED APPLICATIONS

This application is a continuation of U.S. patent application Ser. No. 15/549,906, filed on Aug. 9, 2017, which is a National Stage Entry of International Patent Application No. PCT/CN2016/073850 filed on Feb. 16, 2016, and claims priority to Chinese Patent Application 201510086889.4, filed in the Chinese Patent Office on Feb. 17, 2015, the entire contents of which is hereby incorporated herein by reference in its entirety.

TECHNICAL FIELD

Embodiments of the present invention relate generally to the filed of wireless communication, and particularly to a wireless communication device, method and system for sub-carrier power allocation implemented in a non-orthogonal multiple access communication system.

BACKGROUND ART

Interleave division multiple access is a non-orthogonal multiple access technique with a very great application prospect. As compared with other multiple access techniques such as frequency division multiple access (FDMA), orthogonal frequency division multiple access (OFDMA) and code division multiple access (CDMA), the interleave division multiple access has the advantages of having high power and efficiency and low decoding complexity, and is hopeful to be applied in wireless communication systems of next generation. The high power and efficiency of the interleave division multiple access are determined by the non-orthogonality of the interleave division multiple access, and are realized by user-wise power allocation. The low decoding complexity of the interleave division multiple access is ensured by chip-by-chip detection algorithm adopted by a reception end thereof. To further reduce complexity and resist channel fading, the OFDM technique can be combined with the interleave division multiple access technique to form an OFDM-IDMA communication system, which inherits the advantages of an OFDM system and an interleave division multiple access system, thus becoming a better candidate multiple access scheme for wireless communication systems of next generation.

However, the study on a non-orthogonal multiple access communication system such as the OFDM-IDMA system relates only to a user-wise power allocation scheme, without relating to the study on the problem of sub-carrier-wise power allocation in a deeper level. In addition, the prior art does not relate to a sub-carrier-wise power allocation scheme which can improve system performance.

SUMMARY OF THE INVENTION

In view of the present situation of the foregoing prior art, it is desired to provide a technical solution for dynamical adjustment of sub-carrier power implemented in a non-orthogonal multiple access communication system.

A brief summary in regard to the present invention is given below to provide a basic understanding of some aspects of the present invention. It should be understood that the summary is not an exhaustive summary in regard to the present invention; it does not intend to define a key or important part of the present invention, nor does it intend to limit the scope of the present invention. The object of the summary is only to briefly present some concepts, which serves as a preamble of the detailed description that follows.

According to one aspect of the present application, there is provided a wireless communication device for a non-orthogonal multiple access communication system, comprising: a power adjustment unit for dynamically adjusting, with respect to at least some of user equipments included in the communication system, transmission power of each user equipment in the at least some of user equipments used for respective sub-carriers according to channel state information of the communication system, such that the at least some of user equipments perform uplink data transmission on corresponding sub-carriers with adjusted transmission power.

According to another aspect of the present application, there is further provided a base station for a non-orthogonal multiple access communication system, the base station comprising: the wireless communication management device as stated above, for dynamically adjusting, with respect to at least some of user equipments included in the communication system, uplink transmission power of each user equipment in the at least some of user equipments used for respective sub-carriers according to channel state information of the communication system, such that each user equipment transmits data to the base station on corresponding sub-carriers with adjusted transmission power.

According to another aspect of the present application, there is provided a user equipment for non-orthogonal multiple access communication system, the user equipment comprising: the wireless communication management device as stated above, for dynamically adjusting transmission power of the user equipment used for respective sub-carriers according to channel state information of the communication system, so as to perform uplink data transmission on corresponding sub-carriers with dynamically adjusted transmission power of the user equipment used for respective sub-carriers.

According to another aspect of the present application, there is further provided a communication method for a non-orthogonal multiple access communication system, comprising: dynamically adjusting, with respect to at least some of user equipments included in the communication system, transmission power of each user equipment in the at least some of user equipments used for respective sub-carriers according to channel state information of the communication system, such that the at least some of user equipments perform uplink data transmission on corresponding sub-carriers with adjusted transmission power.

According to another aspect of the present disclosure, there is further provided a communication system, comprising the user equipment as stated above, or comprising the base station as stated above.

In accordance with other aspects of the present disclosure, there is further provided a computer program code for implementing the above method for wireless communication, and a computer program product, as well as a computer-readable storage medium having the computer program code for implementing the above method recorded thereon.

By implementing dynamic allocation of sub-carrier power in a non-orthogonal multiple access communication system, the device, method and system according to the present disclosure could obtain at least one of the following technical advantages: increasing the channel capacity of the communication system; reducing the bit error rate during the communication; and reducing the interference among corresponding user equipments in the communication system.

The above and other advantages of the present application will become more apparent from the following detailed descriptions in regard to preferred embodiments of the present invention in combination with the appended drawings.

BRIEF DESCRIPTION OF THE DRAWINGS

To further describe the above and other advantages and features of the present invention, detailed embodiments of the present invention will be further described in detail in combination with the appended drawings below. The appended drawings together with the following detailed descriptions are comprised in the present specification and form a part thereof. Elements having identical functions and structures will be denoted by identical reference numerals. As should be appreciated, these figures only describe typical examples of the present invention, but shall be regarded as limiting the scope of the present invention. In the appended drawings.

DETAILED DESCRIPTION OF THE EMBODIMENTS

Exemplary embodiments of the present invention will be described in detail combined with the appended drawings below. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly will vary as embodiments are different. In addition, it should be appreciated that although developing tasks are possibly complicated and time-consuming, such developing tasks are only routine tasks for those skilled in the art benefiting from the contents of the disclosure.

It should also be noted herein that, to avoid the present invention from being obscured due to unnecessary details, only those device structures and/or processing steps closely related to the solution according to the present invention are shown in the appended drawings, while omitting other details not closely related to the present invention.

First Embodiment

Figure 1:
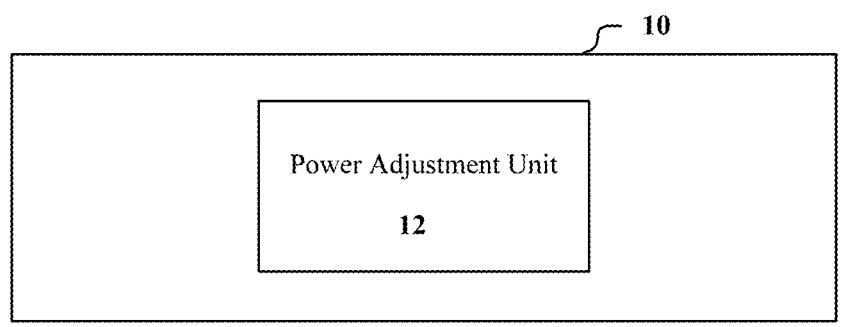
FIG. 1 is a structural block diagram showing a wireless communication device for a non-orthogonal multiple access communication system according to one embodiment of the present disclosure.

FIG. 1 is a structural block diagram showing a wireless communication device 10 for a non-orthogonal multiple access communication system according to one embodiment of the present disclosure. The wireless communication device comprises: a power adjustment unit 12 for dynamically adjusting, with respect to at least some of user equipments included in the communication system, transmission power of each user equipment in the at least some of user equipments used for respective sub-carriers according to channel state information of the communication system, such that the at least some of user equipments perform uplink data transmission on corresponding sub-carriers with adjusted transmission power.

In the present disclosure, the at least some of user equipments included in the communication system refer to active user equipments, i.e. user equipments in a data link communication process. The wireless communication device according to the present disclosure can perform adjustment of sub-carrier power for the at least some of these active user equipments. All user equipments mentioned hereinafter refer to active user equipments in a data link communication process, unless otherwise indicated.

For the sake of clarify, various detailed embodiments of the present disclosure will be described with use of a specific application scenario where an OFDM-IDMA communication system is used as a non-orthogonal multiple access communication system. However, as should be appreciated by those skilled in the art, the technical solution configured according to the embodiment of the present disclosure may be applicable to various non-orthogonal multiple access communication systems other than the OFDM-IDMA communication system, for example to SC-FDMA-IDMA and SCMA.

In the conventional OFDM-IDMA communication systems, power allocations for respective sub-carriers of respective user equipments are fixed and unchanged, thus making it impossible to perform dynamic adjustment. After the method of dynamically adjusting sub-carrier power according to the embodiment of the present disclosure is used, users whose sub-carrier power is adjusted can perform uplink transmission using different power on different sub-carriers. Since the dynamic adjustment of the sub-carriers considers the channel state information of the communication system, communication efficiency is improved. The used channel state information of the communication system for example may be represented by at least one of: information about a channel condition of users on respective sub-channels of the communication system and/or information about interference among at least some of user equipments.

In one specific implementation, the power adjustment unit 12 can adjust transmission power of each user equipment in the at least some of user equipments used for respective sub-carriers, according to channel state information of the communication system, taking the channel capacity of the communication system as an object.

As to with respect to which user equipments in the communication system the adjustment of sub-carrier power is performed, it can for example be determined by a base station that at least some of the user equipments satisfying a predefined conditions perform the adjustment of sub-carrier power. Specifically, the predefined conditions may include at least one of the following: user equipments in which a requirement on the quality of service (QoS) is determined to satisfy a predefined condition (for example to be higher than a predefined condition); user equipments in which the quality of sub-channel is determined to be higher than a predefined condition; and user equipments that are randomly selected. The quality of sub-channel can be measured by parameters such as variance of a sub-channel gain and so on. For example, if the variance of the sub-channel gain is greater than a predetermined threshold, it is regarded that the predefined condition is satisfied.

According to one specific implementation, a dynamic adjustment scheme of transmission power of sub-carriers can also be performed for all the user equipments in the communication system. Among the following descriptions in regard to detailed examples of the dynamic adjustment scheme of transmission power of sub-carriers according to the present invention, some descriptions are made directed to a scenario where the dynamic adjustment scheme of transmission power of sub-carriers is performed for all the user equipments in the communication system, and some descriptions are made directed to a scenario where the dynamic adjustment scheme of transmission power of sub-carriers is performed for some of the user equipments in the communication system; however, the core operating principles involved in the descriptions directed to both the scenarios are similar.

It should be noted herein that, the adjustment of sub-carrier power according to the present disclosure relates to adjustment of transmission power of sub-carriers when the user equipments perform uplink data transmission to a base station, so those skilled in the art could understand that all sub-carrier power mentioned in the specification refer to transmission power of sub-carriers.

According to the present disclosure, the power adjustment unit 12 is configured to dynamically adjust transmission power of respective sub-carriers of each user equipment in the at least some of user equipments according to the channel state information of the communication system, so as to optimize the channel capacity of the communication system.

Figure 2:
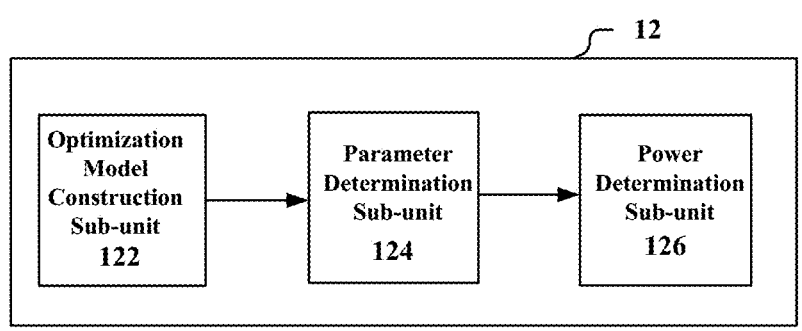
FIG. 2 is a structural block diagram showing one specific implementation of a power adjustment unit in the communication device as shown in FIG. 1.

According to one specific implementation, the power adjustment unit 12 as shown in FIG. 1 can have the specific configuration as shown in the block diagram in FIG. 2. As shown in FIG. 2, the power adjustment unit 12 comprises: an optimization model construction sub-unit 122 for constructing an optimization model based on the channel state information by taking the channel capacity of the communication system as an optimization object and taking the transmission power of respective sub-carriers of each user equipment in the at least some of user equipments as variables to be optimized; a parameter determination sub-unit 124 for determining the channel state information of the communication system; and a power determination sub-unit 1256 for determining, based on the optimization model, the transmission power of respective sub-carriers of each user equipment in the at least some of user equipments according to the channel state information of the communication system, such that the channel capacity of the communication system is maximized.

A detailed example of performing dynamic adjustment of sub-carrier power according to an embodiment of the present invention will be introduced in detail below. For the sake of clarity, in the example below, a specific application scenario is an OFDM-IDMA communication system. However, this is not limitative; as stated above, the technical solution of the embodiment according to the present disclosure can also be applied to other non-orthogonal multiple access communication systems, as long as such systems have a feature that a plurality of user equipments can share the same resource block.

The existing systems based on orthogonal frequency division multiplexing or orthogonal frequency division multiple access technique will also relate to dynamic adjustment of power of sub-carriers, for example "water-filling" algorithm in the OFDM system. In these systems, however, any data sub-carrier can only be exclusively occupied by a certain one of users in any symbol period. Differing from the existing systems based on the OFDM or OFDMA technique, in the OFDM-IDMA communication system any data sub-carrier is simultaneously shared by all active users in any symbol period, so the involved problem of allocation of sub-carrier power is substantively different from that involved in the existing systems, thus making construction of a sub-unit by an optimization model construction sub-unit completely different from that in the existing systems. As can be seen, some of the existing sub-carrier power allocation methods are not applicable to the OFDM-IDMA communication system involved in the embodiment of the present disclosure. Besides, in the existing systems based on orthogonal frequency division multiplexing or orthogonal frequency division multiple access technique, the dynamic adjustment of power of sub-carriers will not cause the performance or the communication efficiency of the communication systems to be improved. The target of the user-wise power allocation is giving average power of data streams of each user, and the target of the sub-carrier-wise power allocation is giving average power of data streams of each user on each sub-carrier. Assuming that there are K users and each user uses N sub-carriers, in view of signaling, the user-wise power allocation is that a base station sends one power numerical value to each user, totaling K power numerical values; while the sub-carrier-wise power allocation is that a base station sends K numerical values to each user, totaling K groups of numerical values.

Figure 3:
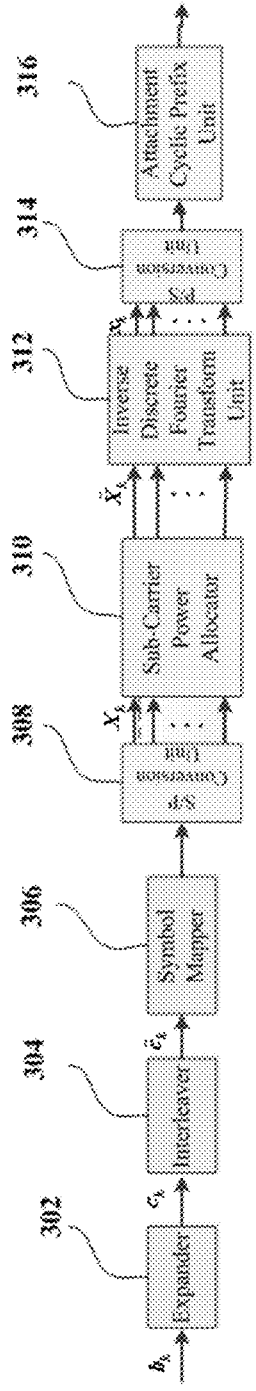
FIG. 3 is a structural block diagram showing a transmission end of the kth user equipment, in an OFDM-IDMA communication system, according to one detailed example of the present disclosure.

FIG. 3 is a structural block diagram showing a transmission end of the kth user equipment, in an OFDM-IDMA communication system, according to one detailed example of the present disclosure. As shown in FIG. 3, transmission information bit vectors $b_k$ are fed into an expander 302 to be expanded, so as to obtain expanded chip vectors $c_k$, and the expander 302 expands the transmission information bit vectors $b_k$ by taking an alternating sequence {+1, −1} as an expansion sequence, a length of the expanded chip vectors being marked as S. Then, the expanded chip vectors $c_k$ are interleaved by an interleaver 304, so as to obtain interleaved chip vectors $\tilde{c}_k$. Generally, in an interleave multiple access system, an interleaver for each user equipment must be different, and the interleavers are unique identifiers for the system to distinguish the user equipments. The interleaved chip vectors $\tilde{c}_k$ are subjected to planisphere modulation by a symbol mapper 306, and are subjected to S/P (Serial to Parallel) conversion by an S/P conversion unit 308, so as to obtain modulated symbol vectors $X_k$ whose lengths are equal to the number N of the sub-carriers, and the power thereof is normalized. A sub-carrier power allocator 310 dynamically adjusts instantaneous transmission power of each user equipment used for respective sub-carriers by the sub-carrier power adjustment method according to the embodiment of the present disclosure, so as to obtain adjusted transmission power marked as $p_{k,n}$, which represents instantaneous power of the nth sub-carrier of the kth user. Then the obtained transmission power is allocated to a corresponding sub-carrier, so as to obtain new symbol vectors $\tilde{X}_k$. Subsequently, the new symbol vectors $\tilde{X}_k$ are subjected to inverse discrete Fourier transform (IDFT) by an IDFT unit 312, so as to obtain time domain signals $x_k$. Then the time domain signals $x_k$ are subjected to Parallel to Serial (P/S) conversion by a P/S conversion unit 314 and are attached with a cyclic prefix (CP) by an attachment CP unit 316, and then the time domain signals attached with the CP are sent to a channel. It should be noted herein that, operations in other component units in the transmission end of the user equipment other than the sub-carrier power adjustment method implemented in the sub-carrier power allocator 310 are well-known to those skilled in the art, and will not be repeatedly described in detail herein.

The above OFDM-IDMA communication system according to the present disclosure differs from the existing systems in that: in the existing systems, the processing of dynamically adjusting power of sub-carriers is not performed, and the modulated symbol vectors $X_k$ are transmitted with equal power, that is, $\tilde{X}_k(n)=\sqrt{P_k}X_k(n)$, where $\tilde{X}_k(n)$ is the nth element of $\tilde{X}_k$; $X_k(n)$ is the nth element of $X_k$; and $P_k$ is average transmission power of the user k, which does not change along with the sub-carrier serial number n. Comparatively speaking, in the above communication system according to the embodiment of the present disclosure, instantaneous transmission power of respective sub-carriers of at least some of users can be dynamically adjusted according to an estimation value of state information of a frequency domain channel, that is, $\tilde{X}_k(n)=\sqrt{p_{k,n}}X_k(n)$, wherein instantaneous power $p_{k,n}$ on the nth sub-carrier changes along with the serial number n. As stated previously, the communication device 12 according to the embodiment of the present invention as shown in FIG. 1 can be realized in the sub-carrier power allocator 310. The specific steps of the method of dynamically adjusting power of sub-carriers will be given later.

Figure 4:
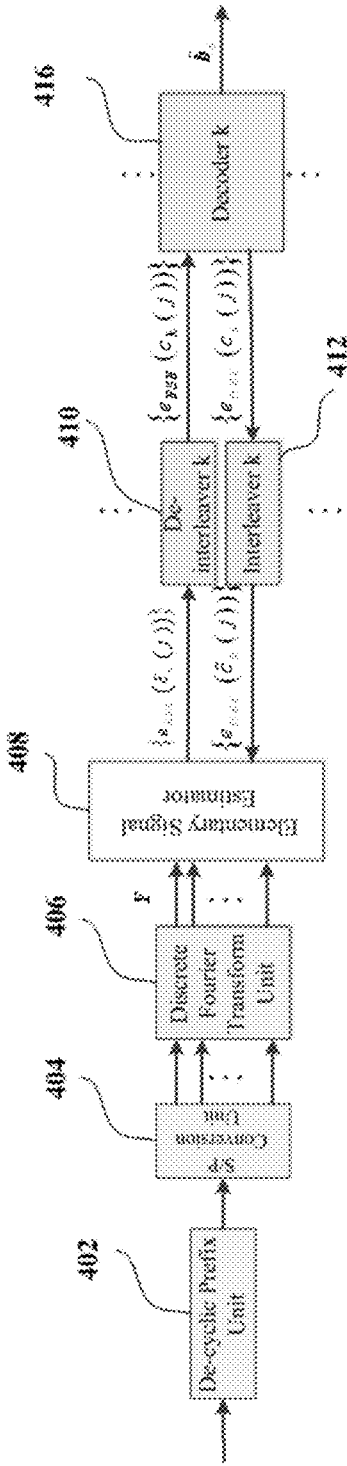
FIG. 4 is a structural block diagram showing a reception end of a base station, in an OFDM-IDMA communication system, according to one detailed example of the present disclosure.

FIG. 4 is a structural block diagram showing a reception end of a base station, in an OFDM-IDMA communication system, according to one detailed example of the present disclosure. According to the present disclosure, the reception end of the base station can receive and process signals transmitted from all the K active user equipments managed by the reception end. As shown in FIG. 4, the received signals first are subjected to a de-cyclic prefix operation by a de-cyclic prefix unit 402, and then are subjected to discrete Fourier transform (DFT) by an S/P conversion unit 404 and a DFT unit 406 to obtain frequency domain reception signals Y. The frequency domain reception signals Y are fed into an elementary signal estimator (ESE) 408. The function of the ESE 408 is decomposing multiuser signals and, taking actual frequency domain reception data Y and A Priori soft information $\{e_{DEC}(\tilde{c}_k(j))\}$ of chips as known conditions, obtaining updated Extrinsic soft information $\{e_{ESE}(\tilde{c}_k(j))\}$ of respective chips of respective users through soft interference elimination operations of multiuser interference which are performed independently on respective sub-carriers. For the nth sub-carrier, the reception signal may be represented as:

$$Y(n) = \sum_{k=1}^{K} h_{k,n}\sqrt{p_{k,n}}\,X_k(n) + Z(n), \quad (1)$$

where, $h_{k,n}$ is channel state information of the nth sub-carrier of the kth user, and $Z(n)$ is noise on the nth sub-carrier.

Since $X_k(n)$ is obtained by modulating adjacent chips, the ESE 408 will estimate the Extrinsic soft information, represented by $\{e_{ESE}(\tilde{c}_k(j))\}$, of the respective chips of the respective users by Chip-by-Chip detection algorithm, according to a signal relationship on the above nth sub-carrier. The soft information sequence $\{e_{ESE}(\tilde{c}_k(j))\}$ is subjected to a corresponding de-interleaving operation by a de-interleaver k 410, so as to obtain corresponding soft information $\{e_{ESE}(c_k(j))\}$ of the chip sequence before the interleaving, the corresponding soft information is fed into a decoder k 416 to be decoded, so as to obtain new Extrinsic soft information $\{e_{DEC}(c_k(j))\}$, which is again interleaved by an interleaver k 412 to obtain software information $\{e_{DEC}(\tilde{c}_k(j))\}$ of the interleaved chip sequence, and the obtained software information is inputted as A Priori information into the ESE 408. At the time of iteration of the first time, the A Priori soft information sequence $\{e_{ESE}(\tilde{c}_k(j))\}$ is zeroed. After iteration of the last time ends, the output of the decoder k 416 is subjected to a hard decision to obtain an estimation value $\hat{b}_k$ of transmission information. As can be seen, the operations of the reception end may be regarded as performing iterative soft interference elimination on the respective sub-carriers. The ESE 408 correlatively performs adjustment in terms of configuration parameters, in correspondence to the sub-carrier power dynamic allocation operation of the sub-carrier power allocator 310 at the reception end of the user as shown in FIG. 3. The specific adjustment manner can be correspondingly carried out by those skilled in the art according to improvements of the transmission end (which mainly relate to improvements of the sub-carrier power allocator 310 in FIG. 3), which will not be repeatedly described in detail herein. It should be noted that operations in other component units in the reception end of the base station other than the operations implemented in the ESE 408 are well-known to those skilled in the art, and will not be repeatedly described in detail herein.

It should be noted herein that, although FIG. 4 only shows that the de-interleaver k 410, the interleaver k 412 and the decoder k 416 for the kth user equipment in all the K user equipments are included in the reception end of the base station, those skilled in the art could understand that a de-interleaver, an interleaver and a decoder for each user equipment in all the K user equipments are included in the reception end of the base station. For the sake of clarity and conciseness of the figure, de-interleavers, interleavers and decoders for other user equipments are shown in the form of ellipsis.

It should be noted herein that, although in the above example the method of dynamically adjusting transmission power of sub-carriers according to the present invention is implemented at the transmission end of the user equipment, those skilled in the art could readily understand that this method of dynamically adjusting transmission power of sub-carriers can also be implemented at a base station or can be implemented in independent devices other than the user equipment and the base station.

Hereinafter, one specific implementation of the dynamic adjustment of sub-carrier power implemented by the sub-carrier power adjustment unit 12 as shown in FIG. 2 in the sub-carrier power allocator 310 in FIG. 3 will be introduced in detail.

It is assumed that the number of the user equipments included in the communication system whose transmission power of sub-carriers is adjusted is K, that the average transmission power of the kth user is k=1, 2, ..., K and that the number of the sub-carriers is N. A parameter determination unit 124 determines the channel state information of the communication system, including an estimation value $\hat{h}_{k,n}$ of the frequency domain channel state information of the nth sub-carrier of the kth user, where k=1, 2, ..., K, n=0, 1, ..., N−1. Noise variance $\sigma_n^2$ and a planisphere modulation manner of the system are known, and the instantaneous transmission power of the nth sub-carrier of the kth user is defined as $p_{k,n}$ (where, k=1, 2, ..., K, n=0, 1, ..., N−1).

According to the present disclosure, the estimation value $\hat{h}_{k,n}$ of the channel state information can be represented by the channel condition of the at least some of user equipments on respective sub-channels of the communication system and/or the multiuser interference among the at least some of user equipments.

An optimization model construction sub-unit 122 constructs an optimization model to be calculated. Instantaneous transmission power $p_{k,n}$ (k=1, 2, ..., K, n=0, 1, ..., N−1) of respective sub-carriers of respective users in the K users are taken as variants to be optimized, and maximizing Sum Channel Capacity in the communication system is taken as an optimization object. Average transmission power of respective sub-carriers of respective users are taken as a first group of constraint conditions, that is, $$\frac{1}{N}\sum_{n=0}^{N-1} p_{k,n} = P_k,$$

where k=1, 2, ... K. Instantaneous transmission power of respective sub-carriers being negative real numbers are taken as a second group of constraint conditions, that is, $p_{k,n} \geq 0$, k=1, 2, ..., K, where n=0, 1 ... N−1.

A power determination sub-unit 126 determines, based on the optimization model, the transmission power of respective sub-carriers of each user equipment in the at least some of user equipments according to the channel state information of the communication system, such that the channel capacity of the communication system is maximized. According to one embodiment of the present disclosure, the power determination sub-unit 126 obtains the instantaneous transmission power $p_{k,n}$ (k=1, 2, ..., K, n=0, 1, ..., N−1) of respective sub-carriers of respective users, for use in the transmission end of the corresponding user equipment in the orthogonal frequency division multiplexing interleave division multiple access communication system, by calculating the optimization model constructed by the optimization model construction sub-unit 122, based on the channel state information of the communication system determined by the parameter determination sub-unit 12.

According to the present disclosure, the transmission power $p_{k,n}$ of each user equipment used for respective sub-carriers determined by the power determination sub-unit 126 satisfies the following predefined constraint condition: the sum of transmission power of respective sub-carriers with respect to the user equipment is equal to the product of average transmission power of the user equipment and the number of the sub-carriers, that is, $$\frac{1}{N}\sum_{n=0}^{N-1} p_{k,n} = P_k,$$

where k=1, 2, ..., K.

According to the present disclosure, the average transmission power of each user equipment is obtained from a base station serving the user equipment.

The Sum Channel Capacity mentioned above is composed of the sum of sub-channel capacity on all the sub-carriers, and a calculation manner of the capacitance of each sub-channel is determined by the planisphere modulation manner of the system. The OFDM-IDMA system generally adopts M-order orthogonal amplitude modulation (M-QAM), and what is most generally used is a planisphere for which M=4, i.e. Quadrature phase shift keying (QPSK) modulation. The Sum Channel Capacity corresponding thereto by this modulation manner is given by the following equation:

$$C_0 = \sum_{n=0}^{N-1} 2(1 - 2^{-\gamma_n}) \qquad (2)$$

where, $C_0$ represents the channel capacity of the communication system which is taken as the optimization object; $\gamma_n$ represents a signal-to-noise ratio of multiuser signals on the nth sub-channel, which is determined based on the channel state information and the transmission power of each user equipment in the at least some of user equipments used for respective sub-carriers; n is the serial number of the sub-carriers, and N is the number of the sub-carriers.

More specifically, where, $\gamma_n$ can be obtained according to $$\gamma_n = \sum_{k=1}^{K} p_{k,n} |\hat{h}_{k,n}|^2 / \sigma_n^2$$

(where n=0, 1, ..., N−1, k=1, 2, ..., K, n=0, 1, ..., N−1); $\hat{h}_{k,n}$ represents channel state information of the nth sub-channel corresponding to the nth sub-carrier of the kth user, which reflects a channel condition of the kth user equipment on the nth sub-channel of the communication system and/or multiuser interference among the respective user equipments; and $\sigma_n^2$ represents noise variance on the nth sub-channel.

That is, according to a preferred embodiment of the present disclosure, the optimization model construction sub-unit 122 can be configured to represent the optimization module by the above equation (2).

The reception end of the OFDM-IDMA system as shown in FIG. 4 processes data on each sub-carrier in parallel using iterative interference elimination technique, so at the time of convergence of an iterative receiver, interference power among multiusers tends to zero, and the Sum Channel Capacity can be approximately given by the following equation:

$$C_0 \approx C_1 = \sum_{n=0}^{N-1} \sum_{k=1}^{K} 2(1 - 2^{-\gamma_{k,n}}) \quad (3)$$

where, $\gamma_{k,n}$ represents a signal-to-noise ratio of the kth user equipment on the nth sub-channel corresponding to the nth sub-carrier, which can be represented by equation $\gamma_{k,n} = p_{k,n} |\hat{h}_{k,n}|^2 / \sigma_n^2$, where k=1, 2, ..., K, n=0, 1, ..., N-1.

By calculating the above optimization problem using $C_1$ as an expression for the Sum Channel Capacity, the following result of instantaneous power allocation can be obtained, that is, the power determination sub-unit 126 determines the transmission power of each user equipment in the multiple users used for respective sub-carriers according to the following equation:

$$p_{k,n} = \max\left[-\frac{\sigma_n^2}{|\hat{h}_{k,n}|^2} \log_2 \frac{\lambda_k}{(2\ln 2)\left(\frac{|\hat{h}_{k,n}|^2}{\sigma_n^2}\right)}, 0\right] \quad (4)$$

where, $p_{k,n}$ represents transmission power of the kth user in the plurality of users used for th nth sub-carrier; max is taking a maximum function, which ensures the property of $p_{k,n}$ being a non-negative real number; the parameter $\lambda_k$ is Lagrange operator introduced to calculate $p_{k,n}$, whose value enables $p_{k,n}$ to satisfy the first group of constraint conditions, that is, the sum of transmission power of respective sub-carriers with respect to the user equipment is equal to the product of average transmission power of the user equipment and the number of the sub-carriers, i.e., $$\frac{1}{N}\sum_{n=0}^{N-1} p_{k,n} = P_k,$$

where k=1, 2, ..., K.

As can be seen from the above equation (4), the system capacity is related to $p_{k,n}$, $\hat{h}_{k,n}$ and $\sigma^2$, and $\hat{h}_{k,n}$ and $\sigma^2$ are parameters related to the configuration of the system, that is, $\hat{h}_{k,n}$ and $\sigma^2$ are nonadjustable once the configuration of the system is determined, so when taking the system capacity as an optimization object, the optimization object can be realized by adjusting the power of the sub-carriers.

Differing from the expression $C_{G,n} = \log_2(1+\gamma_n)$ for the conventional sub-channel capacity, the expression for the respective sub-channel capacity adopted in the present disclosure is $C_{0,n} = 2(1-2^{-\gamma_n})$, for the following reasons: the expression $C_{G,n}$ for the conventional sub-channel capacity is tenable only when the distribution of input signals are in continuous Gaussian distribution; in APSK modulation in the actual OFDM-IDMA system, however, all of input signals of equivalent frequency domain channels are discrete constellation points, and the distribution thereof is finite, equal-probability discrete distribution, rather than Gaussian distribution, so optimization performance will decrease due to inconsistence with the actual distribution characteristic of the input signals if the expression $C_{G,n}$ which is tenable only when the input signals are in continuous Gaussian distribution is adopted. Comparatively speaking, a satisfactory optimization performance can be obtained if the expression $C_{0,n} = 2(1-2^{-\gamma_n})$ for the sub-channel capacity which corresponds to the distribution characteristic of the input signals (i.e. the input signals in finite, distribute distribution) in the actual communication system is adopted.

It should be noted that, the wireless communication device for implementing dynamic adjustment of transmission power of sub-carriers according to the embodiment of the present disclosure which is described above in combination with FIGS. 1-2 can either be realized as an independent function device or be realized in a user equipment in a communication system, for example realized in the transmission end of the user equipment as described in with reference to FIG. 3; of course, it can also be realized in a base station of a communication system, for example realized in the reception end of the base station as described with reference to FIG. 4.

Figure 5:
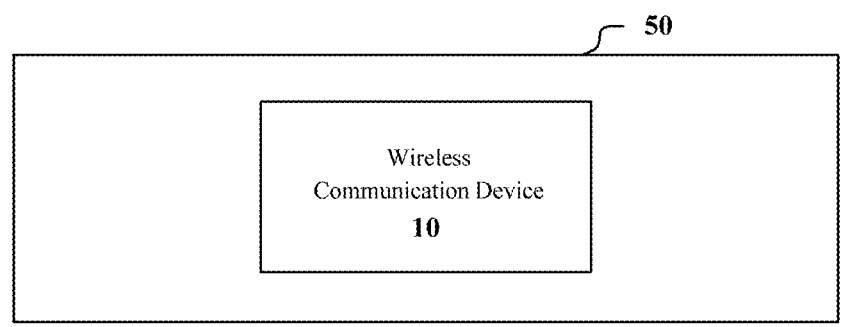
FIG. 5 is a schematic block diagram showing a base station for a non-orthogonal multiple access communication system according to an embodiment of the present disclosure.

FIG. 5 is a schematic block diagram showing a base station 50 for a non-orthogonal multiple access communication system according to an embodiment of the present disclosure. As shown in the figure, the base station 50 comprises the wireless communication management device 10 as shown above with reference to FIGS. 1-2, for dynamically adjusting, with respect to at least some of user equipments included in the communication system, uplink transmission power of each user equipment in the at least some of user equipments used for respective sub-carriers according to channel state information of the communication system, such that each user equipment transmits data to the base station on corresponding sub-carriers with adjusted transmission power.

Figure 6:
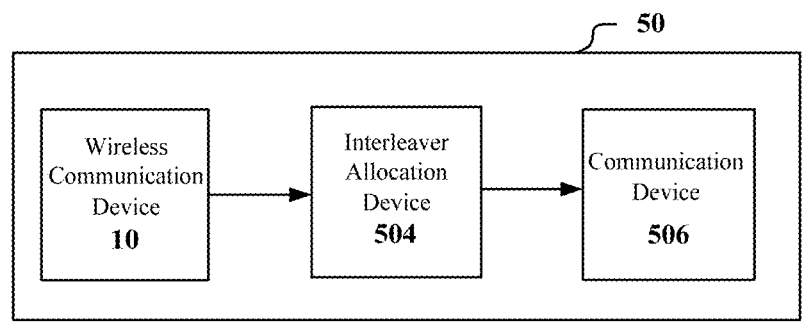
FIG. 6 is a schematic block diagram showing one specific implementation of the base station in FIG. 5.
Figure 10:
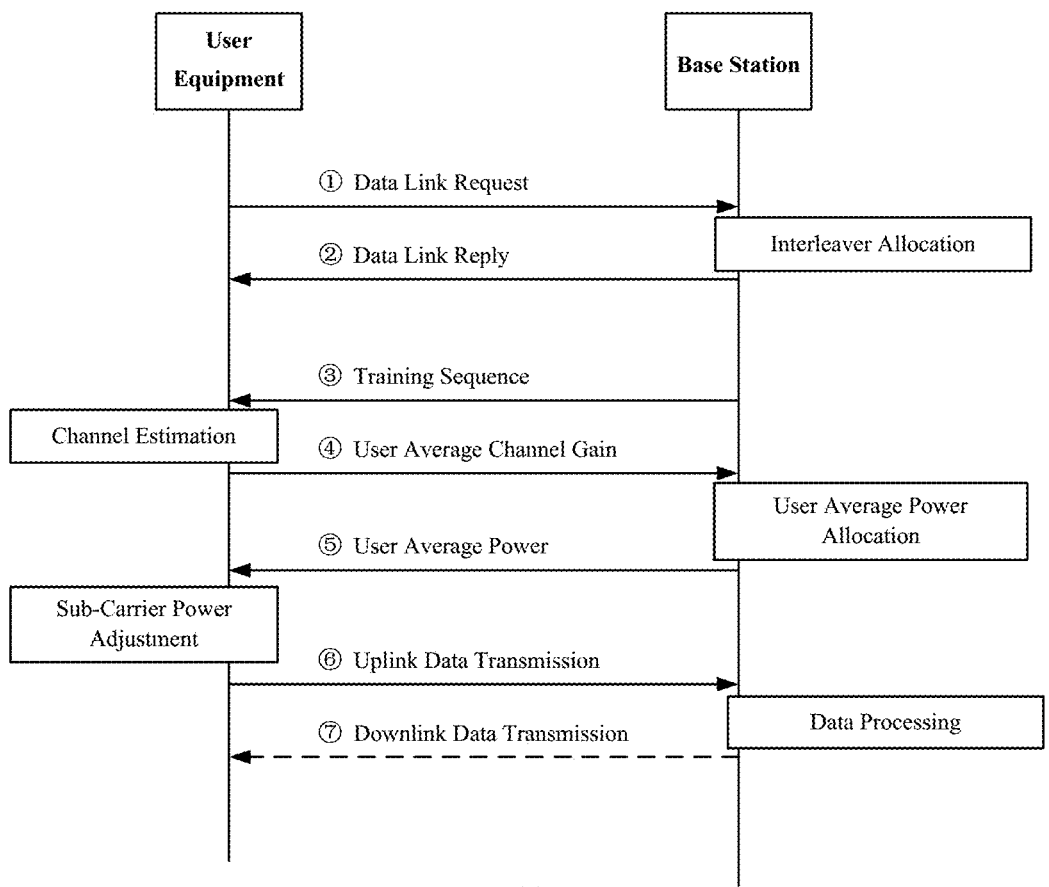
FIG. 10 is a flowchart showing one specific implementation of the communication method according to FIG. 9.

FIG. 6 is a schematic block diagram showing one specific implementation of the base station 50 in FIG. 5. As shown in FIG. 10, the base station 50 further comprises: an interleaver allocation device 502 for allocating a different interleaver for each user equipment in the at least some of user equipments in response to a data link request from the at least some of user equipments; and a communication device 504 for sending an identifier of the allocated interleaver to a corresponding user equipment.

According to one embodiment, the communication device 504 can send the identifier of the allocated interleaver to the corresponding user equipment by a control channel of a physical layer.

According to one embodiment, the communication device 504 can further send a training sequence for estimating the channel state of the communication system to each user equipment in the at least some of user equipments in response to the data link request, wherein, the training sequence is any one of the following: an un-modulated training sequence, an interleave division multiple access modulated training sequence, an orthogonal frequency division multiplexing modulated training sequence, an orthogonal frequency division multiplexing interleave division multiple access modulated training sequence, and a training sequence to be transmitted together in combination with data.

The base station 50 as described in FIGS. 5-6 for example can be configured to perform the operations of the communication device as described in combination with FIGS. 1-2 and 4. Please refer to FIGS. 1-2 and their descriptions for details, which will not be repeatedly described herein.

Figure 7:
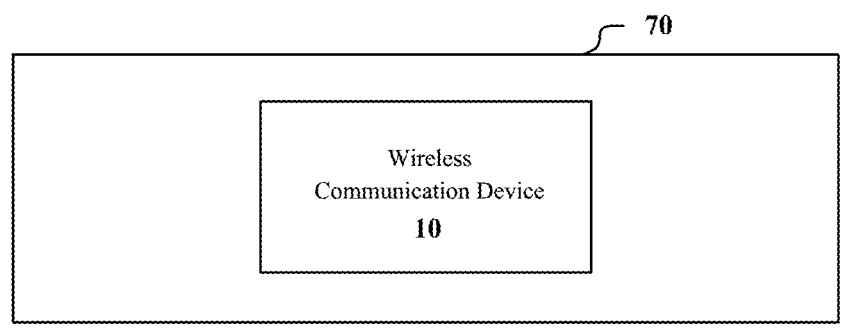
FIG. 7 is a schematic block diagram showing a user equipment 70 for a non-orthogonal multiple access communication system according to an embodiment of the present invention.

FIG. 7 is a schematic block diagram showing a user equipment 70 for a non-orthogonal multiple access communication system according to an embodiment of the present invention. As shown in the figure, the user equipment 40 comprises the wireless communication management device 10 as shown above with reference to FIGS. 1-2, for dynamically adjusting transmission power of the user equipment used for respective sub-carriers according to channel state information of the communication system, so as to perform uplink data transmission on corresponding sub-carriers with dynamically adjusted transmission power of the user equipment used for respective sub-carriers.

Figure 8:
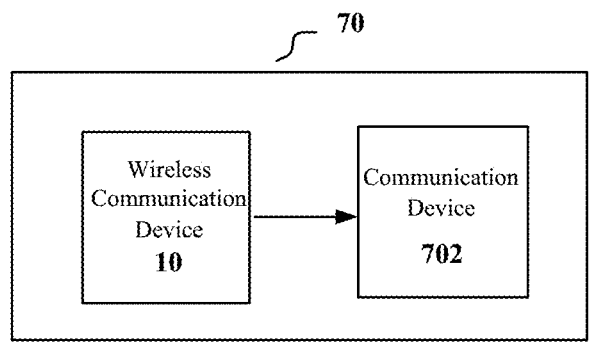
FIG. 8 is a schematic block diagram showing one specific implementation of the user equipment in FIG. 7.

FIG. 8 is a schematic block diagram showing one specific implementation of the user equipment 70 in FIG. 7. As shown in the figure, the user equipment 70 further comprises a communication device 702 for sending a data link request to a base station, and receiving from the base station an identifier of the interleaver that is allocated to the user equipment by the base station in response to the data link request.

According to one embodiment, the communication device 702 for example can be further configured to receive from the base station a training sequence for estimating the channel state of the communication system in response to the data link request, wherein, the training sequence is any one of the following: an un-modulated training sequence, an interleave division multiple access modulated training sequence, an orthogonal frequency division multiplexing modulated training sequence, an orthogonal frequency division multiplexing interleave division multiple access modulated training sequence, and a training sequence to be transmitted together in combination with data.

The user equipment 70 as described in FIGS. 7-8 for example can be configured to perform the operations of the communication device as described in combination with FIGS. 1-3. Please refer to FIGS. 1-3 and their descriptions for details, which will not be repeatedly described herein.

Figure 9:
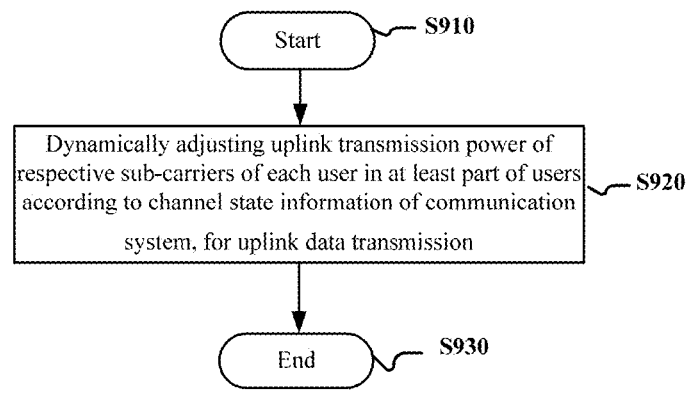
FIG. 9 is a schematic flowchart showing a communication method for dynamically adjusting sub-carrier transmission power of a user in a communication system according to an embodiment of the present disclosure.

FIG. 9 is a schematic flowchart showing a method for dynamic adjustment of sub-carrier transmission power according to an embodiment of the present invention. As shown in FIG. 9, at step S920, with respect to at least some of user equipments included in the communication system, transmission power of each user equipment in the at least some of user equipments used for respective sub-carriers is dynamically adjusted according to channel state information of the communication system, such that the at least some of user equipments perform uplink data transmission on corresponding sub-carriers with adjusted transmission power. Please refer to for example the operations of the power adjustment unit 12 as described in combination with FIGS. 1-2 for details of the step S920, which will not be omitted herein.

FIG. 10 is a flowchart showing one specific example of the method for dynamic adjustment of sub-carrier power in FIG. 9. In the example, the method for dynamically adjusting sub-carrier power is implemented in a user equipment at a user equipment. The example in FIG. 10 takes a time division duplex (TDD) uplink data transmission system as an example, and signaling flow performed between the user equipment UE at the user equipment of the system and the base station BS is as follows:

At step ①, the user equipment located at the user equipment initiates a data link request. At step ②, after the base station agrees the data link request, different interleavers are allocated to users, and a data link reply request is sent. At step ③, the base station sends a training sequence for channel estimation. At step ④, the user equipment at the user equipment performs respective channel estimation upon receipt of the training sequence, so as to obtain an estimation value $\hat{h}_{k,n}$ of the channel state information, and average gains $\Sigma_{n=0}^{N-1}|\hat{h}_{k,n}|2/N$ of the channels are calculated and then sent to the base station. At step ⑤, the base station performs allocation processing of the average power according to the received average gains of the channels of the respective users, and calculates average transmission power $P_k$ needed by the respective user equipments and feeds the average transmission power back to the respective users. At step ⑥, the respective users perform the method for dynamically adjusting sub-carrier power as described in the above embodiment of the present disclosure, so as to obtain respective instantaneous power $p_{k,n}$, and use the adjusted power to uplink data transmission. At step ⑦, the base station processes the received data and sends downlink data according to requirements.

In the above signaling interaction process, most of signaling data relate only to a small amount of data, and can be transmitted by a control channel; only a training sequence and a data block have a large amount of data, and can be transmitted by a data channel.

Figure 11:
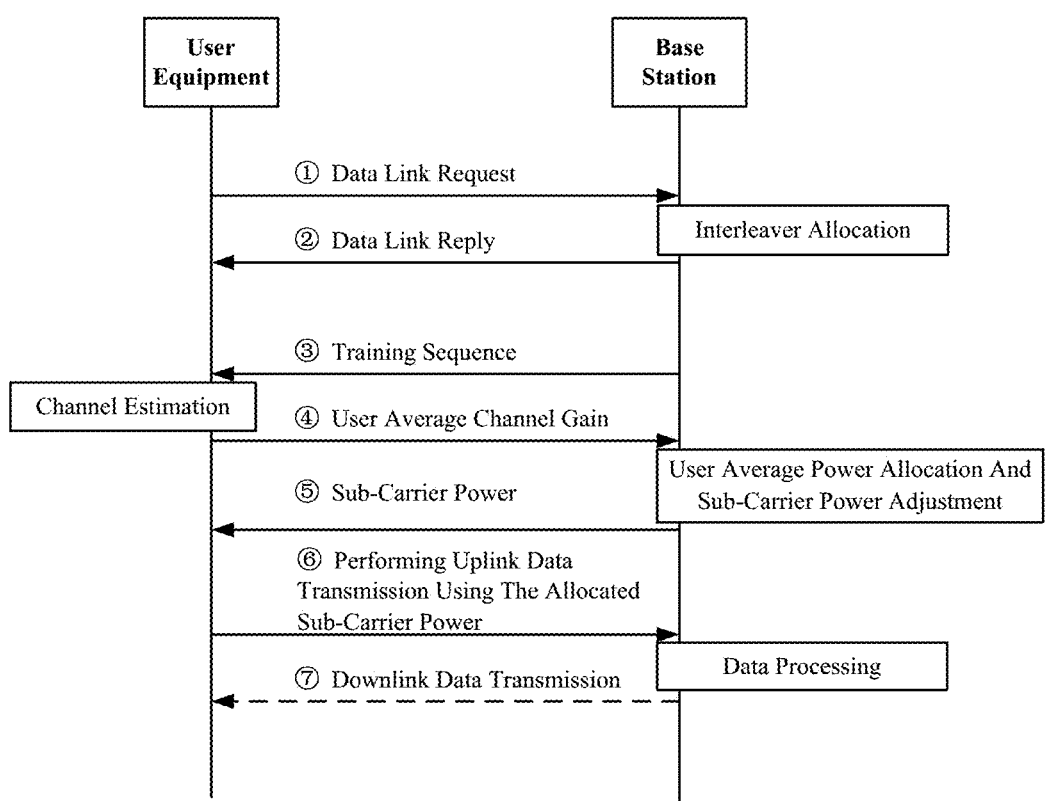
FIG. 11 is a flowchart showing another specific implementation of the communication method according to FIG. 9.

FIG. 11 is a flowchart showing another specific example of the method for dynamic adjustment of sub-carrier power in FIG. 9, which differs from the signaling flow in FIG. 10 in that: in the signaling flow in FIG. 10 the dynamic adjustment of sub-carrier power is performed by the user equipment UE at the user equipment, while in FIG. 11 the dynamic adjustment of sub-carrier power is performed at the base station. Specifically, at step ①, the user equipment located at the user equipment initiates a data link request. At step ②, after the base station agrees the data link request, different interleavers are allocated to users, and a data link reply request is sent. At step ③, the user equipment sends a training sequence for channel estimation to the base station, and the base station estimates the channel estimation of the communication system based on the training sequence. At step ④, allocation processing of average power is performed, and dynamic adjustment of power of sub-carriers is implemented. At step ⑤, the base station sends adjusted transmission power for sub-carriers to a corresponding user terminal via a physical downlink link control channel (PDCCH) by physical downlink control signaling. And, at step ⑥, the user equipment at the user equipment performs uplink data transmission on corresponding sub-carriers with adjusted transmission power, that is, performs data transmission to the base station.

The communication method as described in FIG. 10 for example can be implemented by the user equipment as shown in FIG. 6, and the communication method as described in FIG. 11 for example can be implemented by the base station as shown in FIG. 5. Please refer to FIGS. 5-6 and their detailed descriptions for details, which will not be repeatedly stated herein.

As should be easily understood, the communication system including the base station capable of dynamically adjusting sub-carrier power of the user equipment according to the above embodiment of the present disclosure or including the user device capable of dynamically adjusting sub-carrier power of the user equipment according to the above embodiment of the present disclosure shall also be regarded as being included in the scope of protection of the present disclosure.

Figure 12:
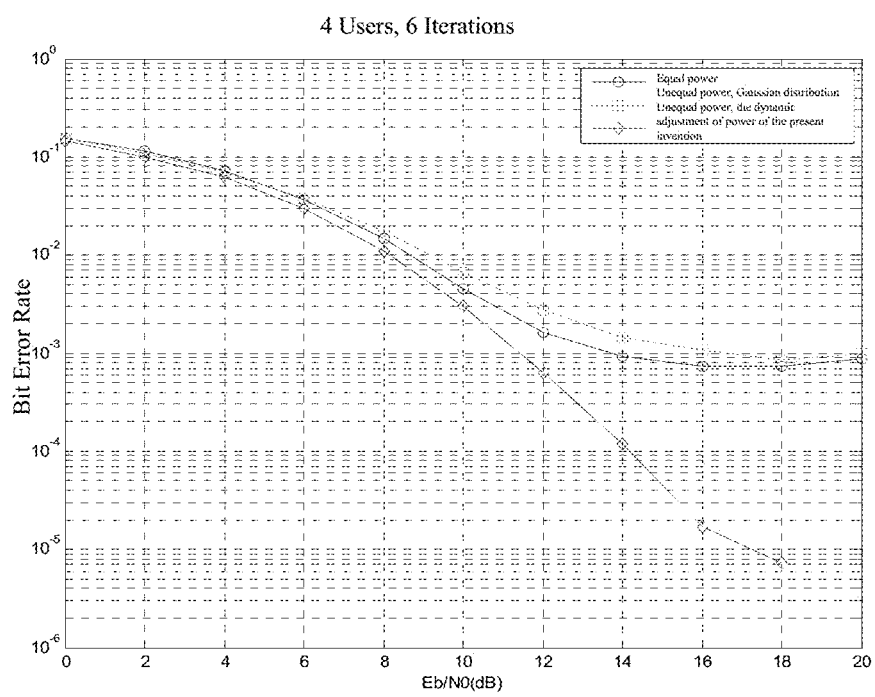
FIG. 12 is a contrast diagram showing a bit error rate curve in a specific configuration manner of a device and a method for dynamically adjusting sub-carrier power according to an embodiment of the present disclosure with respect to the technical solution of the prior art.

FIG. 12 is a contrast diagram showing a bit error rate curve in a specific configuration manner of a communication method according to the present disclosure with respect to the technical solution of the prior art. In the simulation experiment, the transmission end (i.e., the transmission en of the user equipment) of the communication system as shown in FIG. 3 and the reception end (i.e., the reception end of the base station) of the communication system as shown in FIG. 4 are used, and please refer to FIG. 10 for signaling flow. The system-related parameters are as follows: the expansion length S=4, the number of the user equipments K=4, the number of the sub-carriers N=512, the respective user equipments use random interleavers, the planisphere is QPSK-modulated, the channels are 12-tap Rayleigh fading channels, and the number of iterations of the receiver is 6.

FIG. 12 gives a corresponding bit error rate (BER) curve of the system, including a bit error rate result of the existing system, i.e. a result without performing dynamic adjustment of sub-carrier power (the curve is marked as "equal power"), a result obtained by performing optimization according to input signals constructed in Gaussian distribution and a channel capacity target function (the curve is marked as "unequal power, Gaussian distribution") and a result obtained according to the device and method for dynamic adjustment of transmission power of sub-carriers as disclosed in the embodiment of the present invention (the curve is marked as "unequal power, the dynamic adjustment of power of the present invention"). As can be seen from FIG. 12, the bit error rate performance obtained by using the device and method for dynamic adjustment of sub-carrier power according to the embodiment of the present invention is the best; in particular at the time of a high signal-to-noise ratio, the bit error rates according to the other two methods have an error "floor" effect, while the solution according to the embodiment of the present invention does not have an error floor effect. Besides, as can be seen from FIG. 12, if the target function uses the conventional Sum Channel Capacity formula, that is, assuming that the input signals are in Gaussian distribution, the resultant bit error rate is instead higher than the existing one when adjustment of sub-carrier power is not performed; and this phenomenon is contrary to the conclusion that the conventional "water-filling" algorithm can optimize the system performance, because the communication systems optimized by the two are different at all. In an OSFM or OFDMA system in which "water-filling" algorithm is applied, each sub-carrier of the system is exclusively occupied only by one of the users in the system; while in the OFDM-IDMA system involved in the present invention, each sub-carrier is shared by all users.

The basic principle of the present invention has been described above in combination with the detailed embodiment. However, it should be noted that, those skilled in the art could understand that all or any of the steps or components of the device and method according to the embodiment of the present invention can be realized in any computing device (including a processor, a storage medium, etc.) or network of computing devices in the form of hardware, firmware, software or a combination thereof, and this can be realized by those skilled in the art on the basis of the descriptions of the present invention with use of the basic circuit design knowledge or basic programming skills thereof.

As could be understood by those skilled in the art, among the respective constituent components in the device described above, components such as the optimization model construction sub-unit, the parameter determination sub-unit, the power determination sub-unit and so on can be realized by one or more processors, while components such as the communication device and so on can be realized by circuit elements and devices such as an antenna, a filter, a modem, a codec and so on.

In addition, the present invention further proposes a program product having a machine-readable instruction code stored therein. The instruction code, when read and executed by a machine, can implement the above method according to the embodiment of the present invention.

Correspondingly, a storage medium for carrying the program product having the machine-readable instruction code stored therein is also included in the disclosure of the present invention. The storage medium includes but is not limited to a floppy disc, an optical disc, a magnetic optical disc, a memory card, a memory stick and the like.

Figure 13:
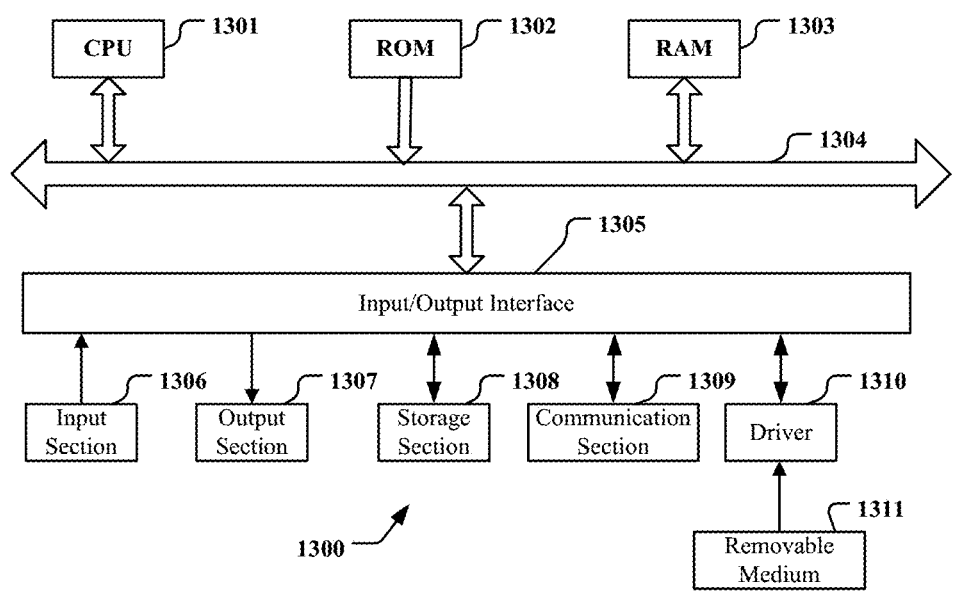
FIG. 13 is a block diagram of an exemplary structure of a universal personal computer in which a device and/or a method and/or a system according to an embodiment of the present invention can be realized.

In the case of carrying out the present invention by software or firmware, programs constituting the software are installed from a storage medium or a network to a computer having a special hardware structure (i.e., the universal computer 1300 as shown in FIG. 13). The computer, when installed with various programs, can implement various functions and the like.

In FIG. 13, a central processing unit (CPU) 1301 performs various processing according to a program stored in a read-only memory (ROM) 1302 or a program loaded from a storage section 1308 to a random access memory (RAM) 1303. In the RAM 1303, data needed when the CPU 1301 performs various processing and the like is also stored according to requirements. The CPU 1301, the ROM 1302 and the RAM 1303 are connected to each other via a bus 1304. An input/output interface 1305 is also connected to the bus 1304.

The following components are connected to the input/output interface 13013: an input section 1306 (including a keyboard, a mouse and the like); an output section 1307 (including a display, such as a Cathode Ray Tube (CRT), a Liquid Crystal Display (LCD) and the like, as well as a loudspeaker and the like); the storage section 1308 (including a hard disc and the like); and a communication section 1309 (including a network interface card such as an LAN card, a modem and so on). The communication section 1309 performs communication processing via a network such as the Internet. According to requirements, a driver 1310 may also be connected to the input/output interface 1305. A detachable medium 1311 such as a magnetic disc, an optical disc, a magnetic optical disc, a semiconductor memory and the like may be installed on the driver 1310 according to requirements, such that a computer program read therefrom is installed in the storage section 1308 according to requirements.

In the case of carrying out the foregoing series of processing by software, programs constituting the software are installed from a network such as the Internet or a storage medium such as the detachable medium 1311.

Those skilled in the art should understand that such a storage medium is not limited to the detachable medium 1311 storing therein a program and distributed separately from the apparatus to provide the program to a user as shown in FIG. 13. Examples of the detachable medium 1311 include a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Or, the storage medium may be hard discs and the like included in the ROM 1302 and the storage section 1308 in which programs are stored, and are distributed concurrently with the apparatus including them to users.

It should also be noted that, in the device, method and system according to the present invention, the respective components or the respective steps can be decomposed and/or recombined. The decomposition and/or recombination shall be regarded as being equivalent solutions of the present invention. In addition, the above series of processing may naturally be performed sequentially in the temporal order as indicated, but not necessarily performed in the temporal order. Some steps may be performed in parallel or independently upon each other.

Finally, it should also be noted that terms "include" and "comprise" or any other variants thereof aim to cover non-exclusive inclusion, such that a process, a method, an article or an apparatus including a series of elements not only includes those elements but also includes other elements not explicitly listed or but also includes elements intrinsic to such a process, method, article or apparatus. In addition, without more limitations, elements defined by expression "including one . . . " do not exclude further existence of other identical elements in a process, a method, an article or an apparatus including the elements.

Although the embodiment of the present invention has been described above in detail in combination with the appended drawings, it should be understood that the embodiment as described above is used only to describe the present invention but does not constitute a limitation to the present invention. Those skilled in the art could carry out various modifications and alterations without departing from the spirit and scope of the present invention. Therefore, the scope of the present invention is defined only by the appended claims and equivalent meanings thereof.

What is claimed is:

1. A wireless communication device for a non-orthogonal multiple access communication system, the wireless communication device comprising:
   circuitry configured to
   dynamically adjust transmission power of respective sub-carriers of partial user equipments of a plurality of user equipments in the non-orthogonal multiple access system, the partial user equipments being determined among the plurality of user equipments based on predefined conditions, the predefined condition being satisfied in case that a requirement of a quality of service (QoS) of the partial user equipments is higher than a first predefined threshold or a quality of sub-channel corresponding to the partial user equipments is higher than a second predefined threshold; and
   perform the dynamic adjustment according to channel state information of the communication system, such that the partial user equipments perform uplink data transmission on corresponding sub-carriers with adjusted transmission power.

2. The wireless communication device according to claim 1, wherein, the channel state information comprises: channel condition information of partial user equipments on respective sub-channels of the communication system, and/or multi-user interference information among the partial user equipments.

3. The wireless communication device according to claim 1, wherein, the circuitry is further configured to dynamically adjust transmission power of respective sub-carriers of the partial user equipments according to the channel state information of the communication system, so as to optimize the channel capacity of the communication system.

4. The wireless communication device according to claim 3, wherein, the circuitry is further configured to:
   construct an optimization model based on the channel state information by taking the channel capacity of the communication system as an optimization object and taking the transmission power of respective sub-carriers of each user equipment in the partial user equipments as variables to be optimized;
   determine the channel state information of the communication system; and
   determine, based on the optimization model, the transmission power of respective sub-carriers of the partial user equipments according to the channel state information of the communication system, such that the channel capacity of the communication system is maximized.

5. The wireless communication device according to claim 1, wherein, any data sub-carrier is simultaneously shared by all active users in any symbol period.

6. The wireless communication device according to claim 4, wherein, the transmission power of each user equipment used for respective sub-carriers determined by the circuitry satisfies the following predefined constraint condition: the sum of transmission power of respective sub-carriers with respect to the user equipment is equal to the product of average transmission power of the user equipment and the number of the sub-carriers.

7. The wireless communication device according to claim 6, wherein, the average transmission power of each user equipment is obtained from a base station serving the user equipment.

8. The wireless communication device according to claim 1, wherein, partial user equipments are selected randomly from the plurality of user equipments included in the communication system.

9. A base station for a non-orthogonal multiple access communication system, the base station comprising:
   circuitry configured to
   dynamically adjust transmission power of respective sub-carriers of partial user equipments of a plurality of user equipments in the non-orthogonal multiple access system, the partial user equipments being determined among the plurality of user equipments based on predefined conditions, the predefined condition being satisfied in case that a requirement of a quality of service (QoS) of the partial user equipments is higher than a first predefined threshold or a quality of sub-channel corresponding to the partial user equipments is higher than a second predefined threshold; and
   perform the dynamic adjustment according to channel state information of the communication system, such that the partial user equipments perform uplink data transmission on corresponding sub-carriers with adjusted transmission power.

10. The base station according to claim 9, wherein the circuitry is further configured to,
    allocate a different interleaver for each user equipment in the partial user equipments in response to a data link request from the partial user equipments; and
    send an identifier of the allocated interleaver to a corresponding user equipment.

11. The base station according to claim 10, wherein, the circuitry is further configured to send the identifier of the allocated interleaver to the corresponding user equipment by a control channel of a physical layer.

12. The base station according to claim 10, wherein, the circuitry is further configured to receive a training sequence from each user equipment in the partial user equipments, so as to estimate the channel state of the communication system based on the training sequence,
wherein, the training sequence is any one of the following: an un-modulated training sequence, an interleave division multiple access modulated training sequence, an orthogonal frequency division multiplexing modulated training sequence, an orthogonal frequency division multiplexing interleave division multiple access modulated training sequence, and a training sequence to be transmitted together in combination with data.

13. A user equipment for non-orthogonal multiple access communication system, the user equipment comprising:
the wireless communication management device according to claim 1, for dynamically adjusting transmission power of the user equipment used for respective sub-carriers according to channel state information of the communication system, so as to perform uplink data transmission on corresponding sub-carriers with dynamically adjusted transmission power of the user equipment used for respective sub-carriers.

14. The user equipment according to claim 13, wherein, the user equipment further comprises user equipment circuitry configured to send a data link request to a base station, and receive from the base station an identifier of the interleaver that is allocated to the user equipment by the base station in response to the data link request.

15. The user equipment according to claim 14, wherein, the user equipment circuitry is further configured to receive from the base station a training sequence for estimating the channel state of the communication system in response to the data link request,
wherein, the training sequence is any one of the following: an un-modulated training sequence, an interleave division multiple access modulated training sequence, an orthogonal frequency division multiplexing modulated training, sequence, an orthogonal frequency division multiplexing interleave division multiple access modulated training sequence, and a training sequence to be transmitted together in combination with data.

16. A communication method for a non-orthogonal multiple access communication system, the method comprising:
dynamically adjusting transmission power of respective sub-carriers of partial user equipments of a plurality of user equipments in the non-orthogonal multiple access system, the partial user equipments being determined among the plurality of user equipments based on predefined conditions, the predefined condition being satisfied in case that a requirement of a quality of service (QoS) of the partial user equipments is higher than a first predefined threshold or a quality of sub-channel corresponding to the partial user equipments is higher than a second predefined threshold; and
performing the dynamic adjustment according to channel state information of the communication system, such that the partial user equipments perform uplink data transmission on corresponding sub-carriers with adjusted transmission power.

* * * * *